United States Patent
Nilsson et al.

(10) Patent No.: US 10,958,297 B2
(45) Date of Patent: Mar. 23, 2021

(54) INTERFERENCE MITIGATION IN A COMMUNICATIONS NETWORK

(71) Applicant: Telefonaktiebolaget LM Ericsson (publ), Stockholm (SE)

(72) Inventors: Thomas Nilsson, Malmö (SE); Dzevdan Kapetanovic, Lund (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/645,549

(22) PCT Filed: Oct. 9, 2017

(86) PCT No.: PCT/EP2017/075590
§ 371 (c)(1),
(2) Date: Mar. 9, 2020

(87) PCT Pub. No.: WO2019/072357
PCT Pub. Date: Apr. 18, 2019

(65) Prior Publication Data
US 2020/0266843 A1  Aug. 20, 2020

(51) Int. Cl.
*H04B 1/04* (2006.01)
*H04W 52/24* (2009.01)
(Continued)

(52) U.S. Cl.
CPC ......... *H04B 1/0475* (2013.01); *H04B 7/0617* (2013.01); *H04L 5/0023* (2013.01);
(Continued)

(58) Field of Classification Search
CPC ..... H04W 36/20; H04W 36/30; H04W 36/36; H04W 40/16; H04W 52/0216;
(Continued)

(56) References Cited

U.S. PATENT DOCUMENTS 8,249,046 B2 * 8/2012 Wu ............... H04B 7/0617
370/343
8,670,432 B2 * 3/2014 Luo ............... H04W 72/082
370/345
(Continued)

FOREIGN PATENT DOCUMENTS

JP  2008148105 A  6/2008

OTHER PUBLICATIONS

Perahia, E. et al., "Next Generation Wireless LANs: 802.11n and 802.11ac", Ed. 2nd, Jan. 1, 2013, pp. 416-419, Cambridge University Press.
(Continued)

*Primary Examiner* — Quochien B Vuong
(74) *Attorney, Agent, or Firm* — Coats & Bennett, PLLC (57) ABSTRACT

There is provided mechanisms for mitigating interference in a communications network. A method is performed by a network node. The method comprises obtaining a packet. The packet has been wirelessly received in an uplink direction by a transmission and reception point of the network node and from a packet sender. The packet is indicative of scheduled transmission of a further packet within a predefined time interval from the transmission and reception point has wirelessly received the packet. The method comprises determining beamforming weights such that interference caused by transmission from the transmission and reception point of the network node in a downlink direction being reversed to the uplink direction is less than a threshold interference value. The method comprises initiating transmission in at least one beam using the determined beamforming weights. The beamforming weights are used for the transmission at least within the predefined time interval.

21 Claims, 4 Drawing Sheets

(51) Int. Cl.
*H04B 7/06* (2006.01)
*H04L 5/00* (2006.01)
*H04L 25/02* (2006.01)
*H04W 16/28* (2009.01)
*H04W 72/08* (2009.01)

(52) U.S. Cl.
CPC ......... *H04L 25/0204* (2013.01); *H04W 16/28* (2013.01); *H04W 52/243* (2013.01); *H04W 72/082* (2013.01)

(58) Field of Classification Search
CPC ............. H04W 52/243; H04W 68/005; H04W 72/042; H04W 72/0431; H04W 72/082; H04W 72/085; H04W 72/1226; H04W 72/1278; H04W 72/1289; H04W 84/12; H04W 88/02; H04W 88/08; H04B 1/0475; H04B 1/715; H04B 7/0417; H04B 7/0617; H04B 7/0619; H04B 7/0626; H04B 7/0632; H04B 2001/7154
See application file for complete search history.

(56) References Cited

U.S. PATENT DOCUMENTS

| | | | |
|---|---|---|---|
| 8,862,140 B2* | 10/2014 | Khaitan | H04W 52/16 455/449 |
| 9,265,048 B2* | 2/2016 | Sampath | H04W 72/082 |
| 9,451,625 B2* | 9/2016 | Jongren | H04W 72/042 |
| 9,537,556 B2* | 1/2017 | Zhou | H04B 7/0617 |
| 2009/0135754 A1 | 5/2009 | Yavuz et al. | |
| 2010/0309854 A1 | 12/2010 | Wu et al. | |
| 2016/0365954 A1 | 12/2016 | Lee et al. | |
| 2017/0093530 A1 | 3/2017 | Kudekar et al. | |

OTHER PUBLICATIONS

Asterjadhi, A. et al., "Misc for Trigger Frame Format", IEEE P802.11 Wireless LANs, Aug. 1, 2017, pp. 1-30, IEEE 802.11-17/1264r2, IEEE.

* cited by examiner

INTERFERENCE MITIGATION IN A COMMUNICATIONS NETWORK

TECHNICAL FIELD

Embodiments presented herein relate to a method, a network node, a computer program, and a computer program product for mitigating interference in a communications network.

BACKGROUND

In communications networks, there may be a challenge to obtain good performance and capacity for a given communications protocol, its parameters and the physical environment in which the communications network is deployed.

For example, one issue concerns so-called overlapping basic service sets (OBSSs). In general terms, a basic service set (BSS) can be defined as a transmission and reception point (TRP), such as an access point (AP), controlled by a network node (NN) and providing network access in a coverage region. The basic service set could operate so as to provide network access according to an IEEE 802.11 based wireless local area network (WLAN) standard. When two or more BSSs with overlapping frequency intervals, or channels, have a network coverage overlap, they become what are known as OBSSs and might thus potentially interfere with each other. Orthogonal channels might be assigned to neighboring BSSs in order to avoid interference. However, in dense deployments where the density of BSSs outnumbers the number of available channels, or frequency intervals, channels (or frequencies) have to be reused and hence, OBSS is inevitable. Also served terminal devices, such as stations (STAs) might cause interference in the OBSS and compete for channel access. This type of co-channel interference might cause performance loss in communications networks.

One type of transmit beamforming was introduced in the standard IEEE 802.11ac, replacing many different beamforming options introduced in the standard IEEE 802.11n. According to the standard IEEE 802.11ac, the direction of a transmit beam is computed based on Channel State Information (CSI) measurements obtained in a sounding procedure between the beamformer (transmitter) and beamformee (receiver). Typically, but not necessarily, the TRP will act as beamformer and served terminal devices as beamformees.

The 802.11ac standard proposes the use of beamforming based on so-called null data packet (NDP) sounding in order for the beamformer to obtain an estimate of the channel. The beamforming at the beamformer then depends on this channel estimation procedure for determining how to radiate energy in a desired direction.

Figure 1:
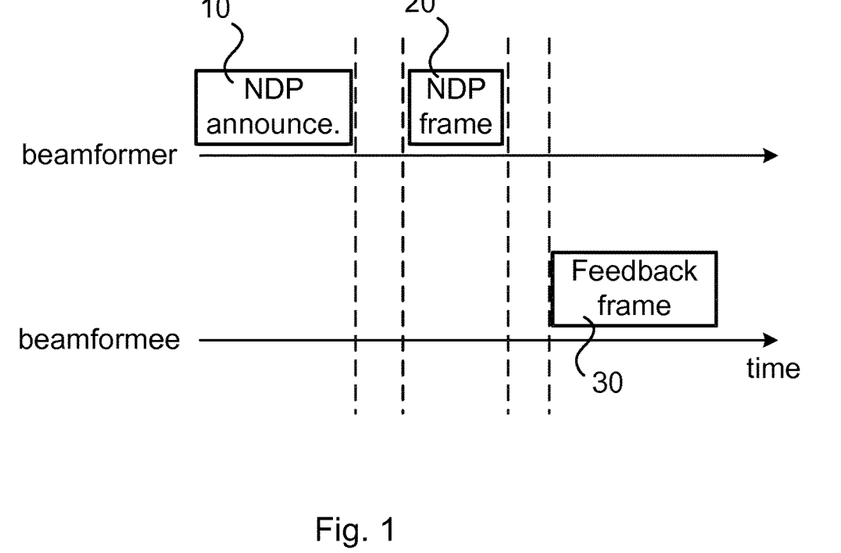
FIG. 1 schematically illustrates null data packet channel sounding in a communication network.

A summary of channel sounding based on NDP will be summarized next with reference to FIG. 1.

S1. The beamformer transmit an NDP announcement frame 10 with the purpose of gaining control of the channel. The terminal devices receiving the NDP announcement frame 10 but not addressed by the NDP announcement frame 10 will then defer channel access in order to avoid interference.

S2. The beamformer transmits an NDP frame 20. The structure of this frame is equivalent to a regular data frame but with the data part removed. Hence, the NDP frame 20 mainly comprises training signals through which the channel can be estimated.

S3. The beamformee receiving the NDP frame 20 estimates the channel by measuring on the training part of the NDP frame 20 and feeds back the estimated channel information to the beamformer in a feedback frame 30. The beamformer receives the feedback from the beamformee in the feedback frame 30 and determines the beamforming directions.

The above disclosed sounding procedure introduces high overhead and the gain from beamforming might be lost unless a large amount of data is transmitted.

One way to ensure a longer transmission period when beamforming is used, is to use a so called Transmission Opportunity (TXOP). The network node can then reserve the channel for a comparatively long time period, e.g. 8 ms, and within this time period perform the sounding procedure and transmit multiple packets with beamforming without having to contend for accessing the channel. This will improve the efficiency of the beamforming procedure.

After the beamforming training procedure, the beamformed downlink transmission from the TRP in the BSS starts. However, there is still a possibility that interference is created.

Hence, there is still a need for an improved handling of interference in a communications network.

SUMMARY

An object of embodiments herein is to provide efficient mitigation of possible interference in a communications network.

According to a first aspect there is presented a method for mitigating interference in a communications network. The method is performed by a network node. The method comprises obtaining a packet. The packet has been wirelessly received in an uplink direction by a transmission and reception point of the network node and from a packet sender. The packet is indicative of scheduled transmission of a further packet within a predefined time interval from the transmission and reception point has wirelessly received the packet. The method comprises determining beamforming weights such that interference caused by transmission from the transmission and reception point of the network node in a downlink direction being reversed to the uplink direction is less than a threshold interference value. The method comprises initiating transmission in at least one beam using the determined beamforming weights. The beamforming weights are used for the transmission at least within the predefined time interval.

According to a second aspect there is presented a network node for mitigating interference in a communications network. The network node comprises processing circuitry. The processing circuitry is configured to cause the network node to obtain a packet. The packet has been wirelessly received in an uplink direction by a transmission and reception point of the network node and from a packet sender. The packet is indicative of scheduled transmission of a further packet within a predefined time interval from the transmission and reception point has wirelessly received the packet. The processing circuitry is configured to cause the network node to determine beamforming weights such that interference caused by transmission from the transmission and reception point of the network node in a downlink direction being reversed to the uplink direction is less than a threshold interference value. The processing circuitry is configured to cause the network node to initiate transmission in at least one beam using the determined beamforming weights. The beamforming weights are used for the transmission at least within the predefined time interval.

According to a third aspect there is presented a network node for mitigating interference in a communications network. The network node comprises an obtain module configured to obtain a packet. The packet has been wirelessly received in an uplink direction by a transmission and reception point of the network node and from a packet sender. The packet is indicative of scheduled transmission of a further packet within a predefined time interval from the transmission and reception point has wirelessly received the packet. The network node comprises a determine module configured to determine beamforming weights such that interference caused by transmission from the transmission and reception point of the network node in a downlink direction being reversed to the uplink direction is less than a threshold interference value. The network node comprises an initiate module configured to initiate transmission in at least one beam using the determined beamforming weights. The beamforming weights are used for the transmission at least within the predefined time interval.

According to a fourth aspect there is presented a system for mitigating interference in a communications network. The system comprises at least one network node according to any of the second and third aspects.

According to a fifth aspect there is presented a computer program for mitigating interference in a communications network, the computer program comprising computer program code which, when run on a network node, causes the network node to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously this method, these network nodes, this system, this computer program, and this computer program product provide efficient mitigation of possible interference in the communications network.

Advantageously this method, these network nodes, this system, this computer program, and this computer program product allows neighboring TRPs to transmit information simultaneously as terminal devices or other TRPs that receive beamformed data, without the transmission from the neighboring TRP causing significant interference at the terminal devices or other TRPs.

Advantageously this method, these network nodes, this system, this computer program, and this computer program product enable spatial reuse, where two or more TRPs can provide access in the same coverage region without causing mutual interference.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
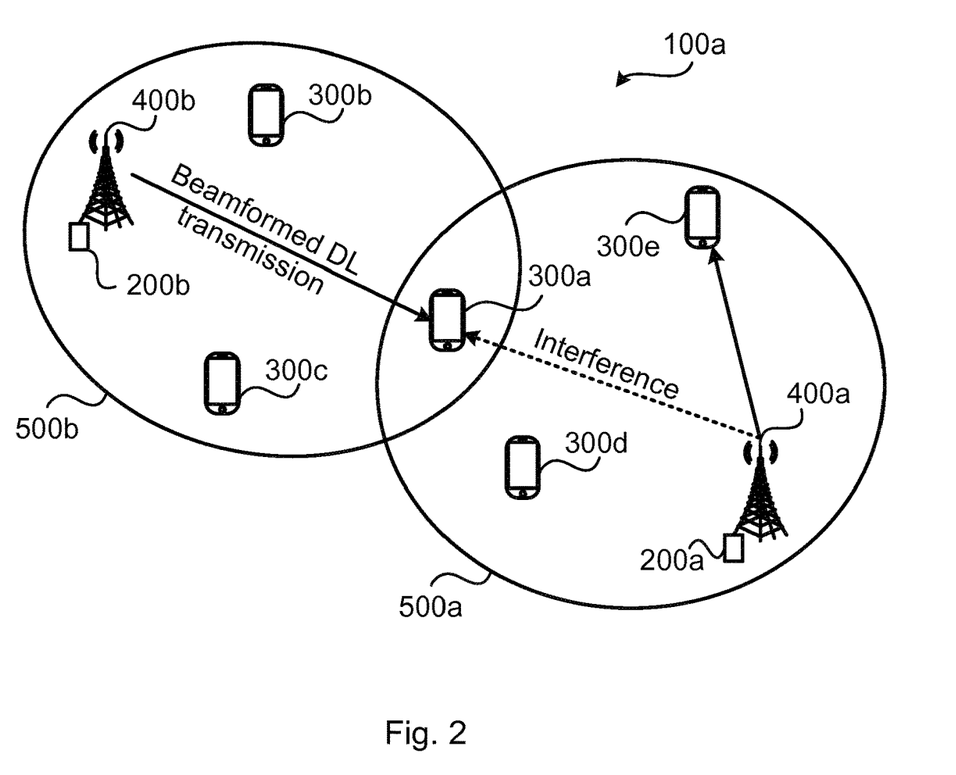
FIGS. 2, 3 and 4 are schematic diagrams illustrating communication networks according to embodiments.

FIG. 2 is a schematic diagram illustrating a communications network 100a where embodiments presented herein can be applied. The communications networks 100a comprises network nodes 200a, 200b, each of which having its own TRP 400a, 300b for serving terminal devices 300a, 300b, 300c, 300d, 300e in a respective coverage region 500a, 500b. Each network node 200a, 200b and its TRP 400a, 400b might form a respective BSS. In this respect it is for illustrative purposes assumed that terminal devices 300a, 300b, 300c are served by network node 200b and that terminal devices 300d, 300e are served by network node 200a.

There could be different examples of network nodes 200a, 200b. Examples include, but are not limited to, radio access network nodes, radio base stations, base transceiver stations, node Bs, evolved node Bs, g node Bs, access points, and access nodes.

There could be different examples of terminal devices 300a, 300b, 300c, 300d, 300e. Examples include, but are not limited to, portable wireless devices, mobile stations, mobile phones, handsets, wireless local loop phones, user equipment (UE), smartphones, laptop computers, tablet computers, network equipped vehicles, modems, and network equipped sensors.

Above it has with reference to FIG. 1 been disclosed how a beam training procedure can be performed in order for the beamformer to determine beamforming weights for subsequent data transmission to its served terminal devices. After the beamforming training procedure, beamformed downlink transmission is thus assumed to start. However, transmission from one TRP 400a may cause interference in another BSS. For example, transmissions from a TRP 400a in a neighboring BSSs might interfere with the transmission of TRP 400b during its TXOP period, thus potentially causing interference.

As in the illustrative example of FIG. 2, the coverage regions 500a, 500b partly overlap and the BSSs might thus be regarded as defining an OBSS. For example, terminal device 300a is assumed to be served by TRP 400b of network node 200b (and thus therefrom receive beamformed downlink (DL) transmission), but might receive transmission acting as interference from TRP 400a of network node 200a. This is illustrated in more detail in FIGS. 3 and 4.

Figure 3:
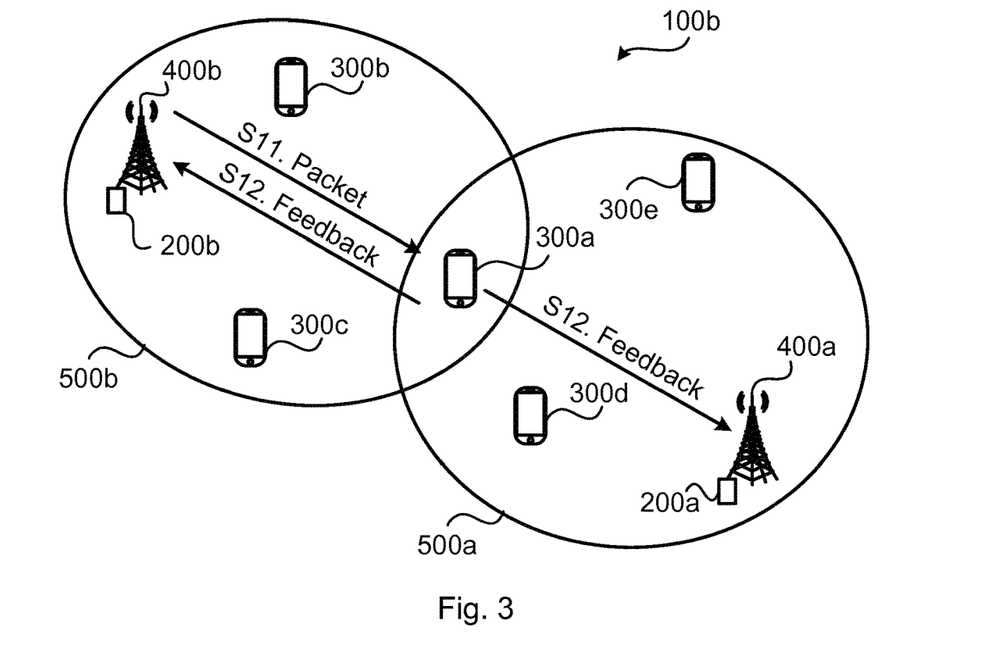

FIG. 3 is a schematic diagram illustrating a communications network 100b where embodiments presented herein can be applied. In addition to all features of FIG. 2, FIG. 3 schematically illustrates a message passing occurring between TRP 400b and terminal device 300a, where TRP 400b in step S11 transmits at least one packet, such as a trigger frame, that the terminal device 300a is assumed to receive and respond to with its own feedback packet, as in step S12. In some aspects step S11 involves at least both steps S1 and S2 as disclosed above and step S12 involves at least step S3 as disclosed above. Since terminal device 300a is located in the partial overlap of coverage regions 500a, 500b, the response transmitted by terminal device 300a to TRP 400b of network node 200b in step S12 will also be received by TRP 400a of network node 200a.

Figure 4:
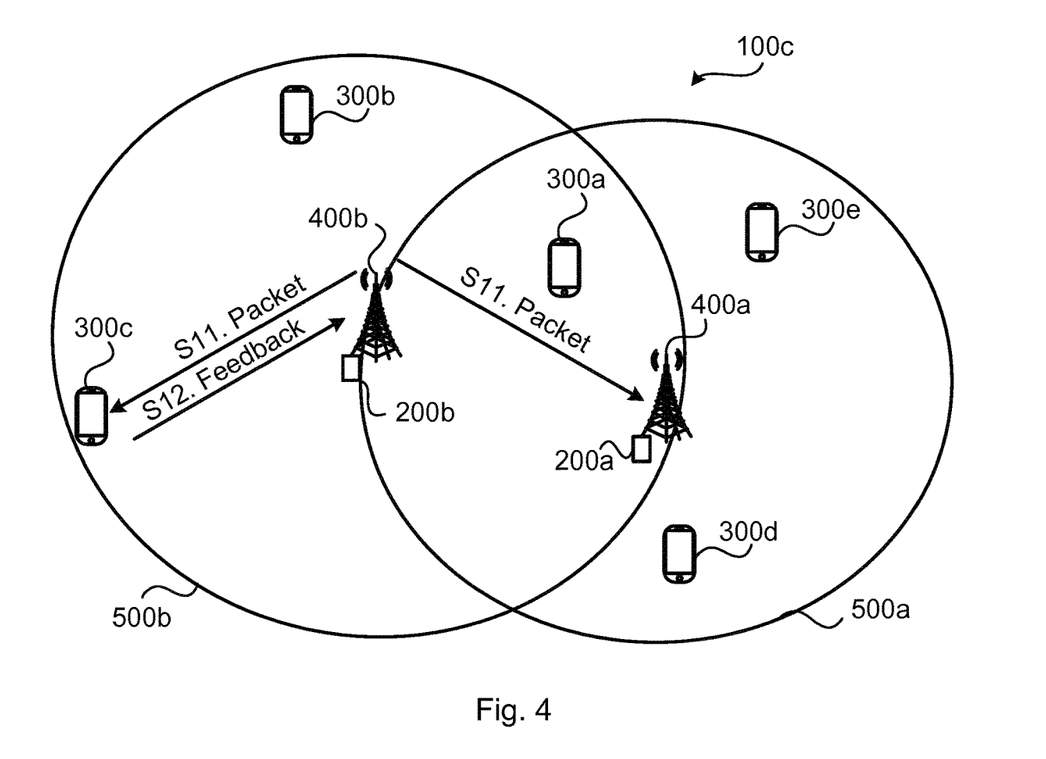

FIG. 4 is a schematic diagram illustrating a communications network 100c where embodiments presented herein can be applied. FIG. 4 differs from FIGS. 2 and 3 in that the TRPs 400a, 400b are located physically closer to each other, thus resulting in the coverage regions 500a, 500b having a larger partial overlap in FIG. 4 than in FIGS. 2 and 3. FIG. 4 additionally schematically illustrates the message passing occurring as in FIG. 3. Since the TRPs 400a, 400b are located so close to each other, TRP 400a will receive the at least one packet as transmitted in step S11 from TRP 400b.

If not handled properly, both illustrative scenarios of FIGS. 3 and 4 will cause interference. The embodiments disclosed herein therefore relate to mechanisms for mitigating interference in a communications network 100a, 100b, 100c. In order to obtain such mechanisms there is provided a network node 200a, a method performed by the network node 200a, a computer program product comprising code, for example in the form of a computer program, that when run on a network node 200a, causes the network node 200a to perform the method.

Figure 5:
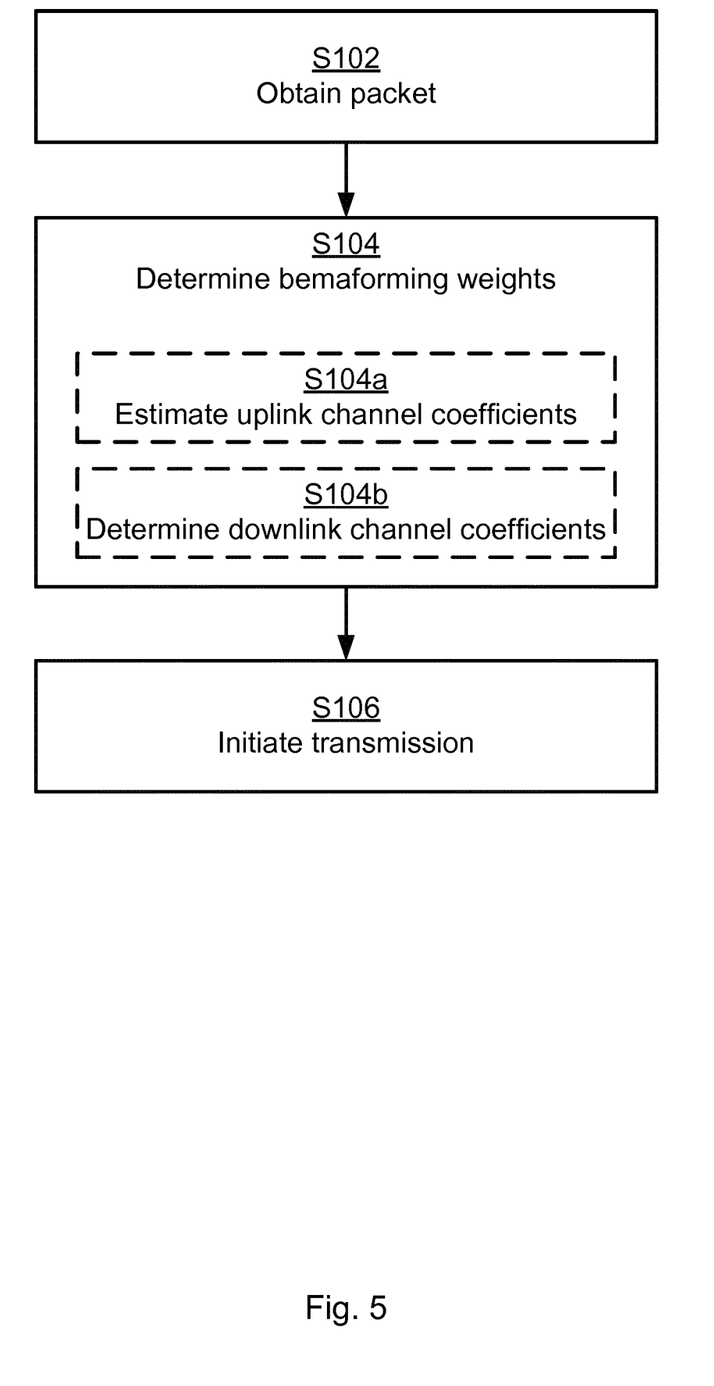
FIG. 5 is a flowchart of methods according to embodiments.

Reference is now made to FIG. 5 illustrating a method for mitigating interference in a communications network 100a, 100b, 100c as performed by the network node 200a according to an embodiment. Continued reference is made to FIGS. 2-4.

In general terms, the herein disclosed embodiments are based on a network node 200a of a TRP 400a overhearing transmissions of a packet from a packet sender, where the packet indicates transmission of a further packet (either from the same packet sender or from another packet sender). Particularly, the network node 200a is configured to perform step S102:

S102: The network node 200a obtains a packet. The packet has been wirelessly received in an uplink direction by a TRP 400a of the network node 200a and from a packet sender 200b, 300a. The packet is indicative of scheduled transmission of a further packet within a predefined time interval from the TRP 400a has wirelessly received the packet.

The network node 200 then uses information of the direction in which the transmission was received when determining its own beamforming weights so as to reduce, or even minimize, the interference in directions that would cause strong interference during transmission of the further packet. The network node 200a is thus configured to perform step S104:

S104: The network node 200a determines beamforming weights such that interference caused by transmission from the TRP 400a of the network node 200a in a downlink direction being reversed to the uplink direction is less than a threshold interference value.

The determined beamforming weights are then used during transmission from the TRP 400a of the network node 200a. The network node 200a is thus configured to perform step S106:

S106: The network node 200a initiates transmission in at least one beam using the determined beamforming weights. The beamforming weights are used for the transmission at least within the predefined time interval.

Embodiments relating to further details of mitigating interference in a communications network 100a, 100b, 100c as performed by the network node 200a will now be disclosed.

There may be different ways to enable the interference caused by the transmission from the TRP 400a to be less than the threshold interference value, thus controlling the level of possible interference caused.

In some aspects the interference is controlled by reducing the power in the downlink direction. That is, according to an embodiment the beamforming weights are determined such that transmission power of the transmission in the downlink direction is less than a threshold power value. The threshold power value depends on the threshold interference value.

In some aspects the interference is controlled by using transmission in a channel being orthogonal to the channel in the uplink direction. The network node 200a might therefore perform channel estimation. Particularly, according to an embodiment the network node 200a is configured to perform (optional) step S104a:

S104a: The network node 200a estimates, using the obtained packet, uplink channel coefficients of an uplink channel in which the packet was wirelessly received from the packet sender 200b, 300a.

The uplink direction is then defined by the uplink channel. That is, according to an embodiment the uplink direction is defined by the uplink channel coefficients.

The channel in the downlink direction might then be determined. Particularly, according to an embodiment the network node 200a is configured to perform (optional) step S104b:

S104b: The network node 200a determines first downlink channel coefficients of a downlink channel towards the packet sender 200b, 300a using the estimated uplink channel.

The beamforming weights might then be determined from the downlink channel. That is, according to an embodiment the beamforming weights are determined based on the first downlink channel coefficients.

There might be different ways to enable transmission in a channel being orthogonal to the channel in the uplink direction and to enable transmission that is orthogonal to the estimated downlink channel. In some aspects the transmission is orthogonal to the estimated downlink channel (where this estimate might be obtained by transposing the estimate of the uplink channel). Particularly, according to an embodiment the transmission is initiated in a second downlink channel with second downlink channel coefficients being orthogonal to the first downlink channel coefficients. The second downlink channel coefficients then define the beamforming weights. That is, a beam with beamforming weights f is constructed that is orthogonal to $H^T$, where H denotes the uplink channel and defines the uplink channel coefficients and thus $H^T$ denotes the downlink channel and defines the first downlink channel coefficients. In other words, the beamforming weights f are constructed such that $H^T f$ is zero (or close to zero). This is the same as $fH^T$ being zero (or close to zero).

There could be different ways to measure the orthogonality. A common measure used is the Frobenius norm of the product between the beams and the downlink channel. The Frobenius norm is generally defined as $\|H^T V\|$, where the columns of V are the beamforming coefficients (or simply denoted as "beams") of the network node 200a used during its transmission initiated in step S106, and where $\|x\|$ denotes the Frobenius norm of x. The smaller the Frobenius norm of $\|H^T V\|$, the more orthogonal the transmission is toward the packet sender 200b, 300a. It is noted that the herein disclosed embodiments are not limited to any particular choice to measure the orthogonality.

The packet sender 200b, 300a might use different number of antennas when transmitting the packet that is obtained by the network node 200a in step S102.

In some aspects it is assumed that the packet sender 200b, 300a uses a single antenna for transmitting the packet. In this case, when the network node 200a obtains the packet it is, in step S104a able to estimate the complete uplink channel from the packet sender 200b, 300a to itself. Assuming channel reciprocity, the transpose of the uplink channel is the downlink channel. This enables the network node 200a the possibility to perform downlink transmission to its own served terminal devices 300d, 300e whilst at the same time avoiding causing significant interference to the packet sender 200b, 300a. If h is the estimated uplink channel vector at the network node 200a (thus replacing H in the expressions above), then $h^T$ is the estimated downlink channel vector and comprises the first downlink channel coefficients. If the network node 200a intends to transmit a downlink packet to some of its served terminal devices 300d, 300e right after receiving the packet from the packet sender 200b, 300a, it can transmit the downlink packet in a direction that is orthogonal (or close to orthogonal) to $h^T$. In this way, little interference is caused at the packet sender 200b, 300a.

In general terms, the packet might be assumed to comprise a pilot configuration, in turn comprising pilot signals in time and frequency, that allows for estimating the uplink channel for a number of streams. Preferably, the uplink channel is to be estimated to each transmit antenna, to get the full rank of the uplink channel. Then the number of streams will be equal to the number of transmit antennas. Specifically, in Wi-Fi, the number of long training field (LTF) symbols used for uplink channel estimation equals the number of streams. However, in other systems there might be a different design of the pilot signals to allow for estimating the complete uplink channel. In some aspects it is assumed that the packet sender 200b, 300a uses more than one antenna for transmitting the packet. In this case, the network node 200a might not be enabled to estimate the complete uplink channel between itself and the packet sender 200b, 300a if the packet only comprises one single symbol. In this case, the network node 200a might only be enabled to estimate one dimension of the uplink channel. For this reason, there might be as many symbols in the packet sent by the packet sender 200b, 300a which enables the network node 200a to estimate the complete uplink channel. In this case, the network node 200a in step S104a obtains an estimate H of the uplink channel matrix, where (due to channel reciprocity) $H^T$ is the first downlink channel. As disclosed above, the network node 200a might thereafter transmit in downlink such that its transmission is orthogonal (or close to orthogonal) to $H^T$. In other aspects only a part of the uplink channel needs to be estimates, which might require fewer symbols in the packet.

There might be different ways to define the predefined time interval. In some aspects, transmission either to or from the packet sender 200b, 300a follows immediately after the packet has been wirelessly received by the TRP 400a of the network node 200a and lasts for the duration of the TXOP. In some aspects the predefined time interval is therefore defined by the next TXOP. That is, according to an embodiment the predefined time interval is defined as a nextcoming transmission opportunity. Thus, although the network node 200a obtaining the packet sent by the packet sender 200b, 300 might not detect the subsequent transmission either to or from the packet sender 200b, 300a, the network node 200a knows that such transmission will start immediately following the reception of the packet by the TRP 400a of the network node 200a. In some aspects the packet has a medium access control (MAC) header that comprises an indication of the duration for the remaining TXOP. The remaining TXOP duration provides the network node 200a with additional information that is useful when scheduling its own served terminal devices 300d, 300e.

There might be different types of packets that the network node 200a obtains in step S102.

In some aspects the packet comprises a feedback frame. That is, according to an embodiment the packet compromises channel state information feedback. The packet sender 200b, 300a is then a terminal device 300a not served by the network node 200a. The intended packet recipient is then the network node 200b serving the terminal device 300a. That is, a network node 200a overhearing a CSI feedback frame transmission from a terminal device 300a, not associated to its own BSS, can conclude that this terminal device 300a might experience interference from downlink transmissions from the TRP 400a of the network node 200a. In case the terminal device 300a is an edge user, the terminal device 300a is likely to experience a large path loss, will be vulnerable to any interference arising in the network node 200a.

There might be different types of information in the packet obtained in step S102 on which the uplink channel estimation is based. According to an embodiment the packet has a preamble. The preamble comprises a legacy long training field (L-LTF). The uplink channel coefficients are then estimated for at least one symbol in the L-LTF field.

The L-LTF might comprise one or more LTF symbols. For example, extra LTF symbols might be provided in the CSI feedback frame in order to enable the network node 200a to learn the complete uplink channel, depending on the number of antennas used by the packet sender 200b, 300a. Particularly, according to an embodiment the L-LTF consists of as many symbols as the packet sender 200b, 300a has antennas. There are thereby as many symbols in the packet sent by the packet sender 200b, 300a which enables the network node 200a to estimate the complete uplink channel.

In some aspects the packet comprises an indication that the packet sender 200b, 300a requires a response from the intended packet receiver. Particularly, according to an embodiment the packet is an announcement packet. The packet sender 200b, 300a is then a TRP 400b of another network node 200b. The intended packet recipient is then a terminal device 300a served by the network node 200b of the TRP 400b. For example, the announcement packet might comprise an NDP announcement frame.

A system for mitigating interference in a communications network 100a, 100b, 100c, could be defined as comprising at least one network node 200a as herein disclosed. In some aspects the system further comprises the TRP 400a and the packet sender 200b, 300a.

Figure 6:
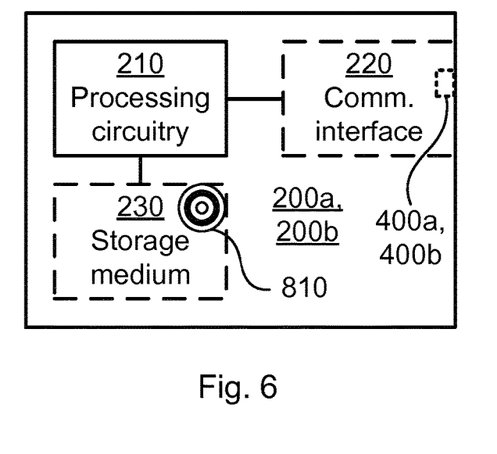
FIG. 6 is a schematic diagram showing functional units of a network node according to an embodiment.

FIG. 6 schematically illustrates, in terms of a number of functional units, the components of a network node 200a, 200b according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200a, 200b to perform a set of operations, or steps, S102-S106, as disclosed above. For example, the storage medium 230 may store the set of operations, and the processing circuitry 210 may be configured to retrieve the set of operations from the storage medium 230 to cause the network node 200a, 200b to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200a, 200b may further comprise a communications interface 220 at least configured for communications with other entities, nodes, functions, and devices in the communications network 100a, 100b, 100c. As such the communications interface 220 may comprise one or more transmitters and receivers, comprising analogue and digital components. Signals could be transmitted from, and received by, a TRP 400a, 400a of the network node 200a, 200b. The TRP 400a, 400b could form an integral part of the network node 200a, 200b or be physically separated from the network node 200a, 200b. The communications interface 220 might thus optionally comprise the TRP 400a, 400b.

The processing circuitry 210 controls the general operation of the network node 200a, 200b e.g. by sending data and control signals to the communications interface 220 and the storage medium 230, by receiving data and reports from the communications interface 220, and by retrieving data and instructions from the storage medium 230. Other components, as well as the related functionality, of the network node 200a, 200b are omitted in order not to obscure the concepts presented herein.

Figure 7:
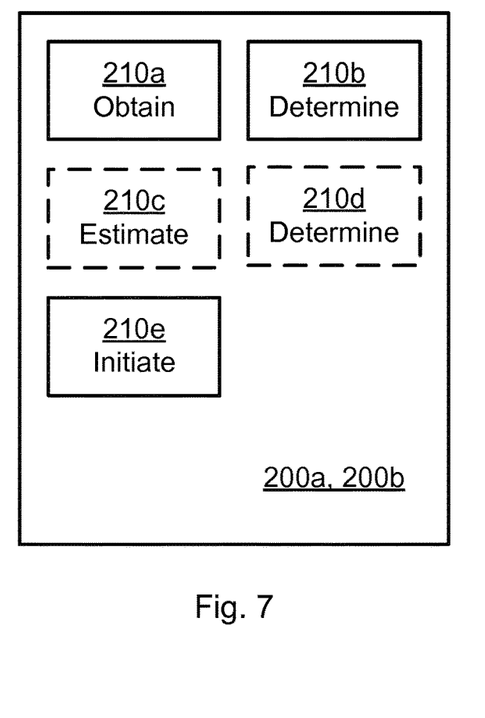
FIG. 7 is a schematic diagram showing functional modules of a network node according to an embodiment.

FIG. 7 schematically illustrates, in terms of a number of functional modules, the components of a network node 200a, 200b according to an embodiment. The network node 200a, 200b of FIG. 7 comprises a number of functional modules; an obtain module 210a configured to perform step S102, a determine module 210b configured to perform step S104, and an initiate module 210e configured to perform step S106. The network node 200a, 200b of FIG. 7 may further comprise a number of optional functional modules, such as any of an estimate module 210c configured to perform step S104a, and a determine module 210d configured to perform step S104b. In general terms, each functional module 210a-210e may in one embodiment be implemented only in hardware and in another embodiment with the help of software, i.e., the latter embodiment having computer program instructions stored on the storage medium 230 which when run on the processing circuitry makes the network node 200a, 200b perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional 210a-210e and to execute these instructions, thereby performing any steps as disclosed herein.

The network node 200a, 200b may be provided as a standalone device or as a part of at least one further device. For example, the network node 200a, 200b may be provided in a node of a radio access network or in a node of a core network. Alternatively, functionality of the network node 200a, 200b may be distributed between at least two devices, or nodes. These at least two nodes, or devices, may either be part of the same network part (such as the radio access network or the core network) or may be spread between at least two such network parts.

Thus, a first portion of the instructions performed by the network node 200a, 200b may be executed in a first device, and a second portion of the of the instructions performed by the network node 200a, 200b may be executed in a second device; the herein disclosed embodiments are not limited to any particular number of devices on which the instructions performed by the network node 200a, 200b may be executed. Hence, the methods according to the herein disclosed embodiments are suitable to be performed by a network node 200a, 200b residing in a cloud computational environment. Therefore, although a single processing circuitry 210 is illustrated in FIG. 6 the processing circuitry 210 may be distributed among a plurality of devices, or nodes. The same applies to the functional modules 210a-210e of FIG. 7 and the computer program 820 of FIG. 8 (see below).

Figure 8:
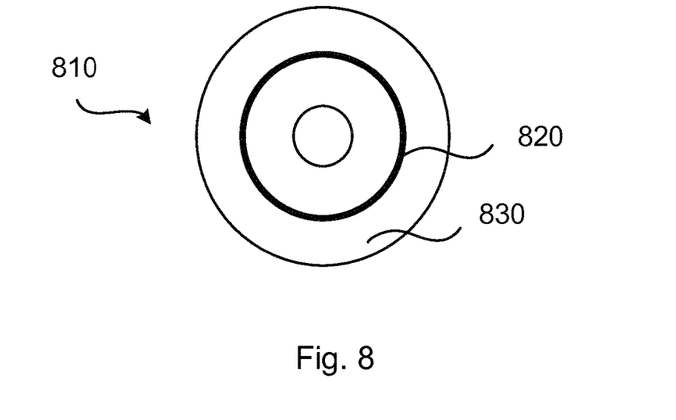
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A network node for mitigating interference in a communications network, the network node comprising:
 processing circuitry;
 memory containing instructions executable by the processing circuitry whereby the network node is operative to:
  obtain a packet, the packet having been wirelessly received in an uplink direction by a transmission and reception point of the network node and from a packet sender; wherein the packet is indicative of scheduled transmission of a further packet within a predefined time interval from the transmission and reception point having wirelessly received the packet; wherein the packet compromises channel state information feedback; and wherein the packet sender is a terminal device not served by the network node;
  determine beamforming weights such that interference caused by transmission from the transmission and reception point of the network node in a downlink direction being reversed to the uplink direction is less than a threshold interference value; and
  initiate transmission in at least one beam using the determined beamforming weights, wherein the beamforming weights are used for the transmission at least within the predefined time interval.

2. The network node of claim 1, wherein the beamforming weights are determined such that transmission power of the transmission in the downlink direction is less than a threshold power value, the threshold power value depending on the threshold interference value.

3. The network node of claim 1, wherein the instructions are such that the network node is operative to estimate, using the obtained packet, uplink channel coefficients of an uplink channel in which the packet was wirelessly received from the packet sender.

4. The network node of claim 3, wherein the uplink direction is defined by the uplink channel coefficients.

5. The network node of claim 3, wherein the instructions are such that the network node is operative to determine first downlink channel coefficients of a downlink channel towards the packet sender using the estimated uplink channel.

6. The network node of claim 5, wherein the beamforming weights are determined based on the first downlink channel coefficients.

7. The network node of claim 6, wherein the transmission is initiated in a second downlink channel with second downlink channel coefficients being orthogonal to the first downlink channel coefficients, the second downlink channel coefficients defining the beamforming weights.

8. The network node of claim 3:
 wherein the packet has a preamble, the preamble comprising a legacy long training field (L-LTF); and
 wherein the uplink channel coefficients are estimated for at least one symbol in the L-LTF field.

9. The network node of claim 8, wherein the L-LTF consists of as many symbols as the packet sender has antennas.

10. The network node of claim 1, wherein the predefined time interval is defined as a next-coming transmission opportunity.

11. The network node of claim 1, wherein the packet comprises an indication that the packet sender requires a response from the intended packet receiver.

12. The network node of claim 11, wherein the packet comprises a null data packet announcement frame.

13. A system for mitigating interference in a communications network, the system comprising:
 a network node, the network node comprising:
  processing circuitry;
  memory containing instructions executable by the processing circuitry whereby the network node is operative to:
   obtain a packet, the packet having been wirelessly received in an uplink direction by a transmission and reception point of the network node and from a packet sender; wherein the packet is indicative of scheduled transmission of a further packet within a predefined time interval from the transmission and reception point having wirelessly received the packet; wherein the packet compromises channel state information feedback; and wherein the packet sender is a terminal device not served by the network node;
  determine beamforming weights such that interference caused by transmission from the transmission and reception point of the network node in a downlink direction being reversed to the uplink direction is less than a threshold interference value; and
  initiate transmission in at least one beam using the determined beamforming weights, wherein the beamforming weights are used for the transmission at least within the predefined time interval.

14. The system of claim 13, further comprising:
 the transmission and reception point; and
 the packet sender.

15. A method for mitigating interference in a communications network, the method comprising a network node:
 obtaining a packet, the packet having been wirelessly received in an uplink direction by a transmission and reception point of the network node and from a packet sender; wherein the packet is indicative of scheduled transmission of a further packet within a predefined time interval from the transmission and reception point having wirelessly received the packet; wherein the packet compromises channel state information feedback; and wherein the packet sender is a terminal device not served by the network node;
 determining beamforming weights such that interference caused by transmission from the transmission and reception point of the network node in a downlink direction being reversed to the uplink direction is less than a threshold interference value; and
 initiating transmission in at least one beam using the determined beamforming weights, wherein the beamforming weights are used for the transmission at least within the predefined time interval.

16. The method of claim 15, wherein the beamforming weights are determined such that transmission power of the transmission in the downlink direction is less than a threshold power value, the threshold power value depending on the threshold interference value.

17. The method of claim 15, further comprising estimating, using the obtained packet, uplink channel coefficients of an uplink channel in which the packet was wirelessly received from the packet sender.

18. The method of claim 17, wherein the uplink direction is defined by the uplink channel coefficients.

19. The method of claim 17, further comprising determining first downlink channel coefficients of a downlink channel towards the packet sender using the estimated uplink channel.

20. The method of claim 19, wherein the beamforming weights are determined based on the first downlink channel coefficients.

21. A non-transitory computer readable recording medium storing a computer program product for mitigating interference in a communications network, the computer program product comprising program instructions which, when run on processing circuitry of a network node, causes the network node to:

obtain a packet, the packet having been wirelessly received in an uplink direction by a transmission and reception point of the network node and from a packet sender; wherein the packet is indicative of scheduled transmission of a further packet within a predefined time interval from the transmission and reception point having wirelessly received the packet; wherein the packet compromises channel state information feedback; and wherein the packet sender is a terminal device not served by the network node;

determine beamforming weights such that interference caused by transmission from the transmission and reception point of the network node in a downlink direction being reversed to the uplink direction is less than a threshold interference value; and initiate transmission in at least one beam using the determined beamforming weights, wherein the beamforming weights are used for the transmission at least within the predefined time interval.

\* \* \* \* \*